Patented Nov. 15, 1938

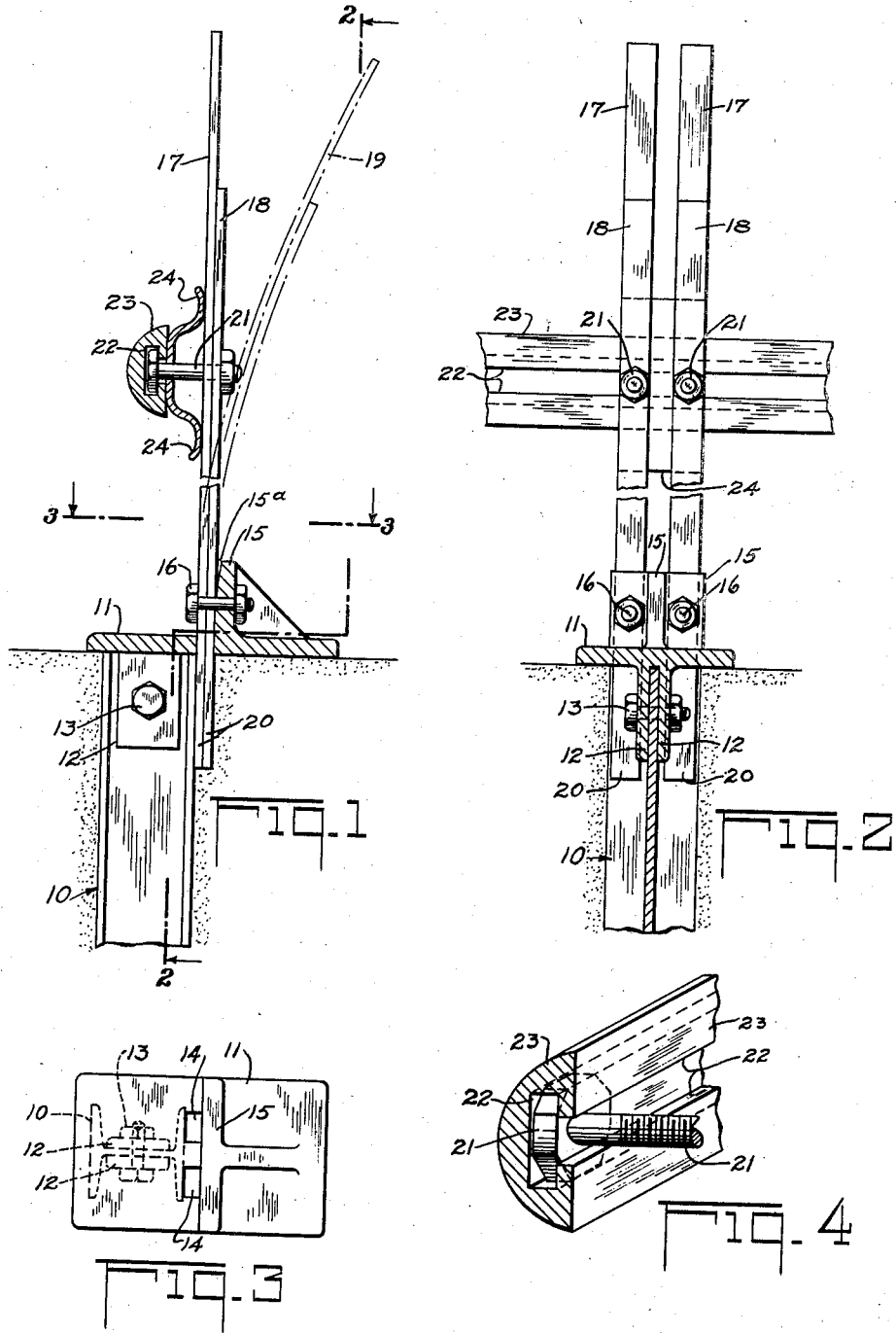

2,136,415

UNITED STATES PATENT OFFICE 2,136,415

SAFETY SYSTEM AND DEVICE FOR USE THEREWITH

Walter V. Cornett, Brooklyn, N. Y.

Application May 19, 1937, Serial No. 143,452

7 Claims. (Cl. 256—13.1)

This invention relates to improvements in a safety system and device for use therewith and has for an object the provision of a system of posts or supports adapted to be placed along the sides of roads or highways to prevent vehicles such as automobiles from running off the road in case of accident.

Another object is to provide such a system wherein the impact of the vehicle is received on a continuous guard or rail supported on a plurality of resilient supports or posts among which the force of the impact is distributed and by which said force is absorbed.

A further object is to provide a new form of support or post particularly suited for use with the system herein described and having the advantages hereinafter pointed out.

In the accompanying drawing:

Figure 1 is a vertical view, partly in section, of one of the supports or posts forming the main subject matter of this application;

Figure 2 is a rear view of the post, Figure 1, with the web of the support 10 shown in section;

Figure 3 is a top view of the post, Figure 1; and

Figure 4 is a view, partly in section, of a preferred form of guard rail for use with the posts shown in the preceding figures.

Referring to Figure 1, the numeral 10 denotes an I beam of suitable dimensions forming a support. This may be driven into the ground to any desired depth. The web of the beam is drilled near the top to admit a bolt 13 to be presently referred to.

The numeral 11 denotes a plate having the downwardly extending flanges 12, 12 adapted to fit snugly in the I beam. These flanges are drilled and bolted to the web of the beam by bolt 13. As the flanges fit the beam closely, the plate is firmly secured to the beam. It may be so secured before the beam is driven in the ground and forms a convenient head for driving the beam.

The plate has one or more apertures 14 therethrough. Adjacent these is the upstanding flange 15. Secured to this flange by bolts 16 are the resilient members 17, 18, forming in effect leaf springs. Obviously any number of leaves can be used on each assembly and one, two or more assemblies can be used on each plate. The physical dimensions of these springs and their number and arrangement will depend upon the character of the safety system, that is to say, the maximum impact the system must withstand, and this can be calculated in a known manner.

It will be observed that each spring assembly is attached to the supporting flange 15 by the bolt 16 at a point midway its ends, and that said assembly is free to flex above said bolt 16, as indicated in dotted lines at 19, Figure 1, the side of flange 15 next to the springs being relieved as shown at 15a to permit this. The springs extend downward through the aperture or apertures 14, as shown at 20 and overlie the support 10. In case pressure is applied to the springs to flex them, this pressure is transmitted via the portion 20 of the springs to the support 10 and via flange 15 to the plate 11.

At a suitable distance above the ground, the spring assembly is drilled for bolt 21. The head of this bolt fits in a slot 22 in the guard member 15 or rail 23. A leaf or coiled spring 24 or other resilient means such as a rubber block, is interposed between the guard 23 and the springs 17, 18.

The guard 23 extends horizontally from post to post and is adapted when struck, to transmit the impact to a plurality of posts and to the spring assemblies thereon which absorb the impact energy.

By providing the slot 22 in the guard rail, it is not necessary to very accurately space each post. However, a steel cable can be used instead of the guard rail, said cable being secured to the bolts 21 in any suitable manner.

By having the bolt 16 above ground, the spring assembly can be replaced in case of damage without digging up the support 10. Also the plate 11 can be replaced in case of breakage by removing the earth about the flanges 12 and bolt 13 without digging up the support 10. The support can, therefore, be safely set in concrete if desired for there is little danger of ever having to replace it in case of severe breakage to any of the parts above ground.

In operation, a row of the posts may be set along a highway in the usual manner. The supports 10 may be buried in concrete and pockets formed about the heads of them to permit attaching the plates 11 later. When the posts are complete, the guard rail 23 will extend along the highway a sufficient height from the ground to engage the average auto wheel or bumper.

Assuming there is an accident and an automobile strikes the rail 23, the force of the impact will be distributed along the rail to several sets of spring assemblies or posts. In each assembly the spring 24 will be flexed and absorb some of the impact. The remaining unabsorbed force is now transmitted to the springs 17, 18, which are flexed as shown at 19, Figure 1, which flexing absorbs some more of the shock. The remaining undissipated force is transmitted to the stationary part of the post.

By providing the springs 17, 18, 24 and interposing them between the applied force of impact and the stationary supports 10, 11, the danger of displacing the fixed parts of the post assembly is minimized, and by providing a continuous guard member or rail 23 to distribute the impact over a number of these posts, the destructive force is further dissipated. The resiliency of the system causes the guard rail to spring sufficiently to throw the automobile back toward the road to a greater degree than with systems using rigid posts and cables.

What is claimed is:

1. A safety device comprising a support having a portion extending below the level of the guard, a leaf spring member secured thereto and extending upwardly therefrom and having a portion extending downwardly below its point of attachment to said support and below said ground level and overlying the side of the support, and a horizontal guard member resiliently supported on said spring member.

2. A safety device comprising a support, a spring member secured thereto and extending upwardly therefrom and having a portion extending downwardly below its point of attachment to said support and overlying the side of same, a horizontal guard member supported on said spring member, and resilient means between said guard and its support.

3. A safety device comprising a support, an apertured plate secured thereto, a spring member secured to said plate and passing through said aperture therein and having a portion extending upwardly therefrom and a portion extending therebelow adapted to laterally engage said support, and a horizontal guard member extending across said spring member and supported thereby.

4. A safety device comprising a support, a plate secured thereto, a spring member secured to said plate and extending upwardly therefrom, a horizontal rail extending across said spring member, and resilient means interposed between said member and rail whereby the latter is supported on said member.

5. A safety device comprising a support, a plate having a flange extending therefrom, means for securing said flange to said support, a second flange extending from said plate, a spring member secured to said second flange, and a horizontal guard member secured to said spring member.

6. In a safety system of the class described, a plurality of supports, resilient members detachably secured to said supports comprising flat springs having portions overlying said supports and being attached thereto at points midway their ends, a guard member extending between said supports and supported on said resilient members, and resilient means between said guard and said members.

7. In a safety system of the class described, a plurality of supports adapted to be buried in the ground, plates adapted to overlie said supports and having integral flanges adapted to be secured thereto at a point below the ground level, resilient members extending upwardly from said plates and removably secured thereto at points above the ground level, and a guard member secured to said members and adapted when struck to transmit shock to said members to be absorbed by the resiliency thereof.

WALTER V. CORNETT.